United States Patent Office 3,183,245
Patented May 11, 1965

3,183,245
PROCESS FOR THE PRODUCTION OF α-METHYL-α-PHENYL-β-ETHYLSUCCINIMIDE
Charles A. Miller, Detroit, and Robert L. Hull, Madison Heights, Mich., assignors to Parke, Davis & Company, Detroit, Mich., a corporation of Michigan
No Drawing. Filed Jan. 4, 1963, Ser. No. 249,334
2 Claims. (Cl. 260—326.5)

This is a continuation-in-part of copending application Serial No. 178,565, filed March 9, 1962, now issued as U.S. Patent 3,162,648.

This invention relates to succinimide compounds. More particularly the invention relates to α-methyl-α-phenyl-β-ethylsuccinimide compounds of the formula

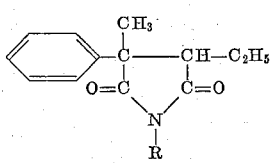

to methods for their production and to their pharmaceutical applications; where R represents hydrogen or methyl.

In accordance with the invention, compounds of the foregoing formula can be produced by heating α-methyl-α-phenyl-β-ethylsuccinic acid or a reactive derivative thereof with a compound of the formula $$RNH_2$$

where R is as defined before. Some examples of suitable reactive derivatives of α-methyl-α-phenyl-β-ethylsuccinic acid are the anhydride and the acid halides. The reaction of α-methyl-α-phenyl-β-ethylsuccinic acid and its reactive derivatives with ammonia or methylamine can follow a stepwise course in which an intermediate reaction product is formed and then undergoes further reaction to give the desired α-methyl-α-phenyl-β-ethylsuccinimide compound upon heating at temperatures substantially in excess of room temperature. When α-methyl-α-phenyl-β-ethylsuccinic acid is employed as a starting material, the intermediate reaction product is a salt of the acid and ammonia or methylamine. Upon heating this salt, preferably at about 150–250° C., it undergoes dehydration and ring closure to yield the desired succinimide. When α-methyl-α-phenyl-β-ethylsuccinic anhydride is used as a starting material, the intermediate reaction product is a half amide, that is, a substituted succinamic acid or a salt thereof. Upon heating, preferably in the presence of a dehydrating agent such as acetyl chloride or acetic anhydride, the half amide undergoes dehydration and ring closure to yield the desired succinimide. When α-methyl-α-phenyl-β-ethylsuccinyl halide is used as a starting material, the intermediate reaction product is a diamide or a mixed amide-acid halide, that is, a substituted succinamyl halide. Upon heating, these products undergo ring closure to yield the desired succinimide. The foregoing intermediate reaction products are other examples of reactive derivatives of α-methyl-α-phenyl-β-ethylsuccinic acid suitable for use in the process of the invention.

The reaction of α-methyl-α-phenyl-β-ethylsuccinic acid or a reactive derivative thereof is carried out with at least one equivalent and preferably an excess of methylamine or ammonia. In those cases where an acid halide is employed as the reactive derivative, it is preferable to use at least three equivalents of methylamine or ammonia. If desired, any of a variety of unreactive solvents can be present although in the case of α-methyl-α-phenyl-β-ethylsuccinic acid, the process is normally carried out by first reacting this acid with aqueous ammonia or aqueous methylamine followed by heating the mixture until volatile components including water are removed.

The α-methyl-α-phenyl-β-ethylsuccinic acid and its reactive derivatives can be prepared by reacting a lower alkyl ester of α-cyano-β-methylcinnamate with potassium cyanide and ethyl bromide to form a lower alkyl ester of α,β-dicyano-α-ethyl-β-methylphenylpropionate which is then hydrolyzed and decarboxylated by heating with aqueous sulfuric-acetic acid to give α-methyl-α-phenyl-β-ethylsuccinic acid. This acid can be converted to reactive derivatives such as the anhydride or the halide by general procedures already known.

Also in accordance with the invention, α-methyl-α-phenyl-β-ethylsuccinimide can be produced by heating a cyano compound of the formula

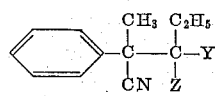

with a strong base in a solvent containing water, followed by acidification to convert the resulting salt form to α-methyl-α-phenyl-β-ethylsuccinimide and if necessary to convert the group Y to hydrogen; where Y is hydrogen or a labile group convertible to hydrogen and Z is a cyano (—CN) or carbamoyl (—CONH₂) group. When Y in the foregoing formula is a labile group convertible to hydrogen, it can represent such groups as lower alkoxycarbonyl (—COO-lower alkyl), carbamoyl or carboxyl. In carrying out the process of the invention, these groups readily undergo decarboxylation or hydrolysis followed by decarboxylation. Some examples of suitable strong bases useful in the process of the invention are alkali metal hydroxides and quaternary ammonium hydroxides. The preferred reagent is an alkali metal hydroxide such as potassium hydroxide or sodium hydroxide. Although the quantity of the alkali metal hydroxide or other basic reagent can be varied over wide limits, it is preferred to use about 3 to 5 moles of the alkali metal hydroxide for each mole of cyano compound. Some suitable solvents for the reaction are aqueous mixtures of lower alkanols, ethylene glycol, diethylene glycol, dimethyl ether, or tetrahydrofuran. A preferred solvent mixture is 70–95% of a lower alkanol with 5–30% water. The temperature at which the process is carried out is not critical and customarily it is carried out in the range of 40–200° C. or at the reflux temperature of the solvent. The preferred temperature range is 60–110° C., and when using 90% ethanol at the reflux temperature the cyclization is substantially complete within about 4–10 hours. The reaction product is present as a salt form in the basic reaction mixture and is isolated as α-methyl-α-phenyl-β-ethylsuccinimide upon acidification. Where the group Y in the foregoing formula is a labile group convertible to hydrogen, it is converted to hydrogen by the acidification operation.

Further in accordance with the invention, N-methyl-α-methyl-α-phenyl-β-ethylsuccinimide can be produced by reacting α-methyl-α-phenyl-β-ethylsuccinimide with a methylating agent. Some examples of suitable methylating agents are esters of methanol such as dimethyl sulfate and methyl halides, and diazomethane. At least one equivalent and preferably a slight excess of the methylating agent is used. Depending upon the particular methylating agent, a variety of solvents and reaction conditions can be used. For example, the methylation with dimethyl sulfate is preferably carried out in water or an aqueous lower alkanol containing a base such as sodium hydroxide or potassium hydroxide; whereas, methylation with diazomethane is preferably carried out in an anhydrous ethereal solvent. The temperature at which the methylation reaction is carried out is not critical and in most cases the reaction is substantially complete within an hour or less at 10–40° C.

The compounds of the invention can exist in diastereoisomeric forms. By fractional crystallization and resolution procedures, the individual diastereoisomers as well as the optically active components can be obtained if desired.

The compounds of the invention have useful pharmacological properties and are of particular value as tranquilizing agents. Their value as tranquilizing agents is associated with a favorable ratio of anticonvulsant activity to hypnotic activity. They have a comparatively high anticonvulsant activity as determined by their ability to prevent the occurrence of convulsions which normally follow the administration of pentamethylenetetrazole, in conjunction with a comparatively low hypnotic activity. They do not cause the more pronounced central nervous system depression of potent hypnotic agents. An additional advantage of these compounds is that they are effective upon oral administration.

Therapeutic compositions of the compounds of the invention are obtained by providing $\alpha$-methyl-$\alpha$-phenyl-$\beta$-ethylsuccinimide and N-methyl-$\alpha$-methyl-$\alpha$-phenyl-$\beta$-ethylsuccinimide in dosage unit form in pharmaceutical carriers or diluents. Dosage unit forms for oral administration are particularly suitable and for this purpose the active ingredient can be incorporated into tablets, powders, capsules, solutions, suspensions and similar forms with pharmaceutically-acceptable solid or liquid carriers or diluents.

The compounds of the invention are employed as tranquilizing agents by administering a total daily oral dose of about 0.2 to 5.0 g., optionally in divided portions. The dose is adjusted by first administering a comparatively small quantity and then increasing it as the response is evaluated; the usual total daily oral dose for maintenance is about 0.5 to 2.0 g.

The invention is illustrated by the following examples.

Example 1

A mixture of 80 g. of $\alpha$-methyl-$\alpha$-phenyl-$\beta$-ethylsuccinic acid and 200 ml. of concentrated aqueous ammonia is heated in an open vessel until the internal temperature reaches 210° C. and then maintained at this temperature for 15–30 minutes at which time distillation has ceased. After cooling the residue is dissolved in ether and the solution is filtered and evaporated. The product, $\alpha$-methyl-$\alpha$-phenyl-$\beta$-ethylsuccinimide, is distilled in vacuo; B.P. 190–200° C./5 mm. For further purification the distillate is dissolved in 50 ml. of methanol and the solution is diluted with water to the point of cloudiness and allowed to stand. The white solid which separates is collected on a filter and dried. If further purification is desired, 20 g. of this product is dissolved in 70 ml. of hot toluene. The solution is chilled and the crystalline product collected and dried first in air and then in vacuo at 55° C.; M.P. 65–66.5° C., mixture of diastereoisomers. The individual diastereoisomers are obtained by fractional crystallization from cyclohexane and from toluene; M.P. 119–120° C. and 61–63° C.

The starting material can be obtained as follows: 70 g. of potassium cyanide is added in one portion to 215 g. of ethyl $\alpha$-cyano-$\beta$-methylcinnamate in 500 ml. of absolute ethanol. The mixture is heated under reflux for one hour, cooled to about 40° C. and then treated with 130 g. of ethyl bromide added in one portion. The solution is heated under reflux for six hours, cooled to 25–30° C. and filtered. The filtrate is combined with a 50 ml. washing of hot ethanol, diluted with water to the point of cloudiness and cooled. The insoluble product, ethyl $\alpha,\beta$-dicyano-$\alpha$-ethyl-$\beta$-methylphenylpropionate, is collected on a filter. This product is added in one portion to a solution of 700 g. of sulfuric acid, 300 g. of water and 200 g. of glacial acetic acid. The mixture is heated under reflux for twenty hours and cooled. The aqueous phase is removed by decantation and 450 ml. of aqueous sodium hydroxide containing 100 g. of sodium hydroxide is added to the residual viscous oil. This mixture is heated under reflux for three hours, cooled, acidified carefully to pH 6, chilled and filtered. The filtrate is acidified to pH 1 and allowed to stand for two days or until the insoluble product has solidified. This product, $\alpha$-methyl-$\alpha$-phenyl-$\beta$-ethylsuccinic acid, is collected on a filter and dried.

Example 2

With continuous stirring 236 g. of $\alpha$-methyl-$\alpha$-phenyl-$\beta$-ethylsuccinic acid is added to 231 g. of 40% aqueous methylamine. While stirring is continued, the mixture is gradually heated to 200° C. The distillate is discarded. The residue consisting of crude N-methyl-$\alpha$-methyl-$\alpha$-phenyl-$\beta$-ethylsuccinimide is fractionated by distillation in vacuo. The principal fraction is collected at a boiling point of about 174–180° C./3.0–3.75 mm. and is the desired product. If further purification is desired, it can be redistilled in vacuo; colorless liquid, B.P. 129° C./0.13 mm.

The same product is obtained by the substitution of 218 g. of $\alpha$-methyl-$\alpha$-phenyl-$\beta$-ethylsuccinic anhydride (prepared by heating $\alpha$-methyl-$\alpha$-phenyl-$\beta$-ethylsuccinic acid with acetyl chloride) for the $\alpha$-methyl-$\alpha$-phenyl-$\beta$-ethylsuccinic acid in the foregoing procedure.

Example 3

With stirring, 32.6 g. of ethyl $\alpha,\beta$-dicyano-$\alpha$-ethyl-$\beta$-methylphenylpropionate is added to a solution of 33.8 g. of 86% potassium hydroxide in 157 ml. of 95% ethanol and 9.2 ml. of water. The mixture is heated under reflux with continued stirring for 8 hours and is then filtered to remove precipitated potassium carbonate. The filter cake is washed twice with 20 ml. portions of 95% ethanol and the combined filtrate and washings are concentrated under reduced pressure below 40° C. to a volume of about 70 ml. This concentrated filtrate is diluted with an equal volume of cold water and acidified to about pH 1.0 by the slow addition below 40° C. of 29.9 g. of 37.3% hydrochloric acid. It is then extracted with a total of 50 ml. of ethyl acetate in four portions and the combined ethyl acetate extract is washed three times, each with a solution of 2.5 g. of sodium sulfate in 18 ml. of water and then dried over anhydrous magnesium sulfate and filtered. The filtrate is evaporated under reduced pressure and the oily residue of crude $\alpha$-methyl-$\alpha$-phenyl-$\beta$-ethylsuccinimide is fractionally distilled under reduced pressure. The product is obtained as a fraction boiling at 198–204° C. at 0.9–1.4 mm.; M.P. 64–69° C. following crystallization from a mixture of ether, cyclohexane, and petroleum ether. This product is a mixture of diastereoisomers. The individual diastereoisomers are obtained by fractional crystallization from cyclohexane and from toluene; M.P. 119–120° C. and 61–63° C.

Example 4

A reaction mixture prepared by adding 14.6 g. of $\alpha$-methyl-$\alpha$-phenyl-$\beta$-ethylsuccinonitrile to a solution of 11.2 g. of 86% potassium hydroxide in 102 ml. of 95% ethanol and 6 ml. of water is heated under reflux for 6 hours, concentrated under reduced pressure to a volume of about 60 ml., diluted with 100 ml. of cold water and acidified to pH 1.0 with hydrochloric acid. The acidified mixture is extracted three times with 100 ml. portions of ether and the ether extracts are washed several times with water, dried over anhydrous magnesium sulfate and filtered. The ether filtrate is extracted with 100 ml. of 1 N sodium hydroxide and the aqueous extract is separated and acidified with hydrochloric acid. The insoluble $\alpha$-methyl-$\alpha$-phenyl-$\beta$-ethylsuccinimide which separates is collected; M.P. 63–66° C., mixture of diastereoisomers. The individual diastereoisomers are obtained by fractional crystallization from cyclohexane and from toluene; M.P. 119–120° C. and 61–63° C.

The starting material can be obtained as follows. A reaction mixture prepared by adding 108 g. of ethyl α,β-dicyano-α-ethyl-B-methylphenylpropionate to a solution of 112 g. of 86% potassium hydroxide in 553 ml. of 95% ethanol and 32.5 ml. of water is stirred and heated under reflux for 15 minutes. The insoluble potassium carbonate is removed by filtration and washed with 75 ml. of 95% ethanol. The combined filtrate and washing is evaporated under reduced pressure to about one-half its previous volume and then diluted with an equal volume of cold water and acidified to pH 1 with hydrochloric acid, employing external cooling as reqired to maintain the temperature below 40° C. The oil which separates upon acidification is extracted with a total of 600 ml. of ether in three portions and the combined ether extract is washed three times with 125 ml. portions of 10% sodium hydroxide solution, washed twice with water, dried over anhydrous magnesium sulfate and filtered. The filtrate is evaporated and the oily residue is fractionally distilled under reduced pressure. The α-methyl-α-phenyl-β-ethylsuccinonitrile is collected at B.P. 130° C. at 0.7 mm.

*Example 5*

A reaction mixture prepared by adding 216 g. of α-ethyl-β-cyano-β-methyl-β-phenylpropionamide to a solution of 72 g. of 86% potassium hydroxide in 660 ml. of 95% ethanol and 39 ml. of water is heated under reflux for 1 hour, evaporated under reduced pressure to a volume of 390 ml., diluted with an equal volume of cold water and acidified to pH 1 with hydrochloric acid. The acidified mixture is extracted three times with 500 ml. portions of ethyl acetate and the combined ethyl acetate extract is washed several times with water and then dried over anhydrous magnesium sulfate and filtered. The filtrate is evaporated to yield an oily residue of crude α-methyl-α-phenyl-β-ethylsuccinimide which is then fractionally distilled under reduced pressure. The product is collected at B.P. 198–204° C. at 1 mm.; M.P. 64–69° C., mixture of diastereoisomers. The individual diastereoisomers are obtained by fractional crystallization from cyclohexane and from toluene; M.P. 119–120° C. and 61–63° C.

The starting material can be obtained as follows. With stirring, 131 g. of α-methylphenylacetonitrile is slowly added to 39 g. of sodamide in 500 ml. of absolute ether. After the addition is complete the mixture is heated under reflux for 2 hours. With continued stirring, 166 g. of α-bromobutyramide is added in small portions and the mixture is heated under reflux for an additional 3 hours and then diluted with 300 ml. of water. The ether phase is separated, washed with water, dried over anhydrous magnesium sulfate and filtered. The filtrate is evaporated to yield a residue of crude α-ethyl-β-cyano-β-methyl-β-phenylpropionamide, suitable for use without further purification.

*Example 6*

A solution is prepared by dissolving 21.7 g. of α-methyl-α-phenyl-β-ethylsuccinimide in 150 ml. of water containing 4.8 g. of sodium hydroxide. The solution is cooled and 13.9 g. of dimethyl sulfate is added in portions with stirring. Stirring is continued for one more hour and the insoluble oily precipitate of N-methyl-α-methyl-α-phenyl-β-ethylsuccinimide is extracted with a total of 300 ml. of ethyl acetate in three portions. The combined ethyl acetate extract is washed several times with water, dried over anhydrous magnesium sulfate and filtered. The filtrate is evaporated under reduced pressure and the oily residue is fractionated by distillation under reduced pressure. The product is collected as a colorless liquid; B.P. 129° C. at 0.13 mm.

We claim:

1. Process for the production of α-methyl-α-phenyl-β-ethylsuccinimide which comprises heating a cyano compound of the formula

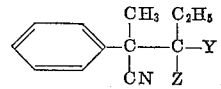

with a strong base in a solvent containing water, followed by acidifying the resulting product; where Y is a member of the class consisting of hydrogen, lower alkoxycarbonyl, carbamoyl, and carboxyl, and Z is a member of the class consisting of cyano and carbamoyl.

2. Process for the production of α-methyl-α-phenyl-β-ethylsuccinimide which comprises heating ethyl α,β-dicyano-α-ethyl-β-methylphenylpropionate with an alkali metal hydroxide in an aqueous lower alkanol followed by acidifying the resulting product.

References Cited by the Examiner

Miller et al.: "J. Am. Chem. Society," vol. 73, pages 5608–5610 (1951).

NICHOLAS S. RIZZO, *Primary Examiner*.